(12) United States Patent
Sween et al.

(10) Patent No.: US 7,843,432 B2
(45) Date of Patent: Nov. 30, 2010

(54) MOUSE PAD CARRYING CASE

(75) Inventors: Barry Sween, Santa Monica, CA (US);
Maaike Evers, San Francisco, CA (US);
Mike Simonian, San Francisco, CA (US)

(73) Assignee: Belkin International, Inc., Playa Vista, CA (US)

( * ) Notice: Subject to any disclaimer, the term of this patent is extended or adjusted under 35 U.S.C. 154(b) by 910 days.

(21) Appl. No.: 11/649,993

(22) Filed: Jan. 5, 2007

(65) Prior Publication Data

US 2008/0164157 A1    Jul. 10, 2008

(51) Int. Cl.
*G09G 5/08* (2006.01)
(52) U.S. Cl. .................... 345/163; 345/156; 383/21; 383/31; 383/42; 383/78; 383/84; 206/307.1; 206/320; D3/201; D3/226; D3/301; D6/626; D6/632; D6/635
(58) Field of Classification Search ................ 345/163, 345/156; 248/346.01; 206/100, 118, 307–387.15, 206/701–728, 338, 756, 307.1; D14/458; 383/21–24, 11, 31, 42, 78–79, 93, 97–99; D3/201, 301, 226; D6/626–635
See application file for complete search history.

(56) References Cited

U.S. PATENT DOCUMENTS

| | | | |
|---|---|---|---|
| 6,186,321 B1 * | 2/2001 | Eskandry | 206/308.1 |
| 7,207,539 B1 * | 4/2007 | Jacobs | 248/346.01 |
| D555,351 S * | 11/2007 | Sween et al. | D3/201 |
| 2005/0067319 A1 * | 3/2005 | Wei | 206/576 |
| 2007/0084976 A1 * | 4/2007 | Bate et al. | 248/118 |

* cited by examiner

*Primary Examiner*—Lun-Yi Lao
*Assistant Examiner*—Jennifer T Nguyen
(74) *Attorney, Agent, or Firm*—Bryan Cave LLP (57) ABSTRACT

An embodiment of the present invention provides a carrying case for computer and electronic accessories containing a foldable mouse pad 90. The foldable mouse pad includes a perimeter extending around the mouse pad 130, wherein the perimeter contains a fastener 120, so that when the mouse pad folds it can form a storage pouch. Other embodiments of the present invention provide a mouse pad 200 having a pocket 220 for storage of computer and electronic accessories and a mouse pad comprising a perimeter of piping 180 to prevent a mouse from sliding off the mouse pad on an uneven surface.

30 Claims, 6 Drawing Sheets

510 ~ | Provide a mouse pad having a perimeter and a fastener located at the perimeter, so that the mouse pad and the fastener can form a storage pouch when the mouse pad is folded and the fastener is fastened

↓

520 ~ | Place an object over an interior surface of the mouse pad

↓

530 ~ | Fold the mouse pad

↓

540 ~ | Fasten the Fastener

FIG. 6

MOUSE PAD CARRYING CASE

FIELD OF THE INVENTION

This invention relates generally to a mouse pad carrying case for portable electronic devices and computer accessories, and relates more particularly to a mouse pad that converts into a carrying case for transport, storage, and protection of portable electronic devices and computer accessories.

BACKGROUND OF THE INVENTION

Electronic devices and computer accessories, such as a mouse for use on a mouse pad or flash drives, have become increasingly portable as technology advances. This invention relates to carrying cases for these portable electronic devices and computer accessories. These electronic devices and computer accessories are easily damaged or misplaced, and are, in general, hard to manage, without a carrying case. Accordingly, there exists a need for a mechanism capable of safely and conveniently storing and carrying these portable electronic devices and computer accessories while also maintaining their portable nature.

It would, therefore, be advantageous to provide a carrying case for these portable devices that incorporates the best of all previous products and improves upon them. Such a carrying case would allow the user to safely and conveniently store and carry his or her devices. In particular, it would be advantageous to provide an extra function to a mouse pad so it can be converted into a storage and transport device. This feature would be useful for computer users who move from location to location either in their home, office, or on a trip.

BRIEF DESCRIPTION OF THE DRAWINGS

The invention will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the present invention, the mouse pad carrying case is a mouse pad that converts into a carrying case or other storage pouch for a mouse or other computer or electronic accessories so they can be easily carried from one location to another either in the home or office or going to another location all together. The mouse pad has a fastener which extends around the perimeter of the mouse pad, so that when the mouse pad is folded in half the fastener can be fastened to itself to allow the mouse pad to become a storage pouch or carrying case. This folding in half of the mouse pad creates the pouch in which the mouse or other computer or electronic accessories can be stored. The mouse pad storage pouch or carrying case can fit one or more objects.

In another embodiment of the present invention, the mouse pad carrying case has a mouse pad and a fastener, wherein the mouse pad and the fastener form a storage pouch when the mouse pad is folded and the fastener is fastened. In a further embodiment, the mouse pad carrying case further contains a top surface and a bottom surface opposite the top surface, wherein the top surface is designed to be used as a surface on which a mouse is operated.

As used herein, the term "fastener" means anything that fastens. Non-limiting examples of fasteners useful in an embodiment of the present invention include zippers, velcro, buttons and corresponding button holes, and male and female snap buttons. Preferably the fastener is a zipper.

The mouse pad can be any shape and size that, when folded in half, has the ability to form a pouch. Preferably, the mouse pad is circular, oval-shaped, square with right-angle corners, or rectangular-shaped with rounded corners. Most preferably, the mouse pad is circular-shaped with a diameter of from about 15 cm (centimeters) to about 30 cm, and more preferably from about 20 cm to about 25 cm, and most preferably about 22 cm.

In a most preferred embodiment of the mouse pad carrying case, a zipper is added to the perimeter of a neoprene circular mouse pad which allows the mouse pad to convert into a storage pouch. The thickness of the neoprene is preferably from about 1 mm (millimeters) to about 5 mm, more preferably from about 2 mm to about 3 mm, and most preferably about 2 mm.

Another embodiment of the present invention provides a mouse pad comprising a pocket for storage of computer and electronic accessories, e.g., a mouse or flash drive. The pocket of the mouse pad can be any shape and size, preferably large enough for a mouse, and the pocket of the mouse pad can be located anywhere, where use of the mouse pad with a mouse is not hampered by the placement of the pocket. Preferably, the pocket is placed towards the perimeter of the mouse pad and/or at the bottom surface of the mouse pad. The pocket has an opening, and the opening can be closable or sealable. The opening of the pocket can be closed or sealed such that the object in the pocket will not accidentally fall out of the pocket. The mouse pad can be any size and shape. Preferably, the mouse pad is circular, oval-shaped, square with right-angle corners, or rectangular-shaped with rounded corners.

A further embodiment of the present invention provides a mouse pad comprising a rim, such as, for example, a perimeter of piping, to prevent a mouse from sliding off a top surface of the mouse pad on or located over an uneven or slanted surface when the mouse pad is in use.

In a further embodiment of the present invention, the mouse pad has an attachment mechanism coupled to it. The attachment mechanism can be anything capable of attaching the mouse pad to another object. For example, the attachment mechanism can be used to attach the mouse pad to a case handle, belt loop, backpack, or the attachment mechanism can simply be used as a carrying handle. In a preferred embodiment, the attachment mechanism is designed to point away from the user when the mouse pad is in use. The attachment mechanism can be metal (e.g., key ring) or fabric (e.g., velcro strap, strap with snap button, or strap with button and button hole).

Preferably, the attachment mechanism is a velcro strap with male and female velcro binding swatches placed within it. Most preferably, the attachment mechanism is a velcro strap, which when folded in half is 160 mm long and 30 mm wide with male and female velcro binding swatches (40×30 mm) placed within it.

In a further embodiment of the present invention, the mouse pad has a non-skid pattern printed on or molded to the under or bottom side of the mouse pad to eliminate or reduce sliding on table surfaces. Preferably, the non-skid pattern printed on or molded to the under or bottom side of the mouse pad is a high-friction silicone or textured rubber material.

Another embodiment of the present invention is method of folding a mouse pad. This method includes folding a mouse pad having a fastener and fastening the fastener to keep the mouse pad folded. In this method, the mouse pad also has a surface for accommodating a mouse and, prior to completely fastening the fastener, an object can be placed over the surface of the mouse pad. Also in this method, the mouse pad can have a perimeter, wherein the fastener is located at the perimeter. As used herein, the phrase "prior to completely fastening" includes, for example, prior to buttoning the last of several buttons, prior to fully zipping the zipper closed, etc.

Yet another embodiment of the present invention is a method of enclosing an object in a mouse pad carrying case. This method includes placing an object on or over an interior surface of a mouse pad having a perimeter and a fastener located at the perimeter, so that the mouse pad and the fastener can form a storage pouch when the mouse pad is folded and the fastener is fastened; folding the mouse pad; and fastening the fastener.

Figure 1:
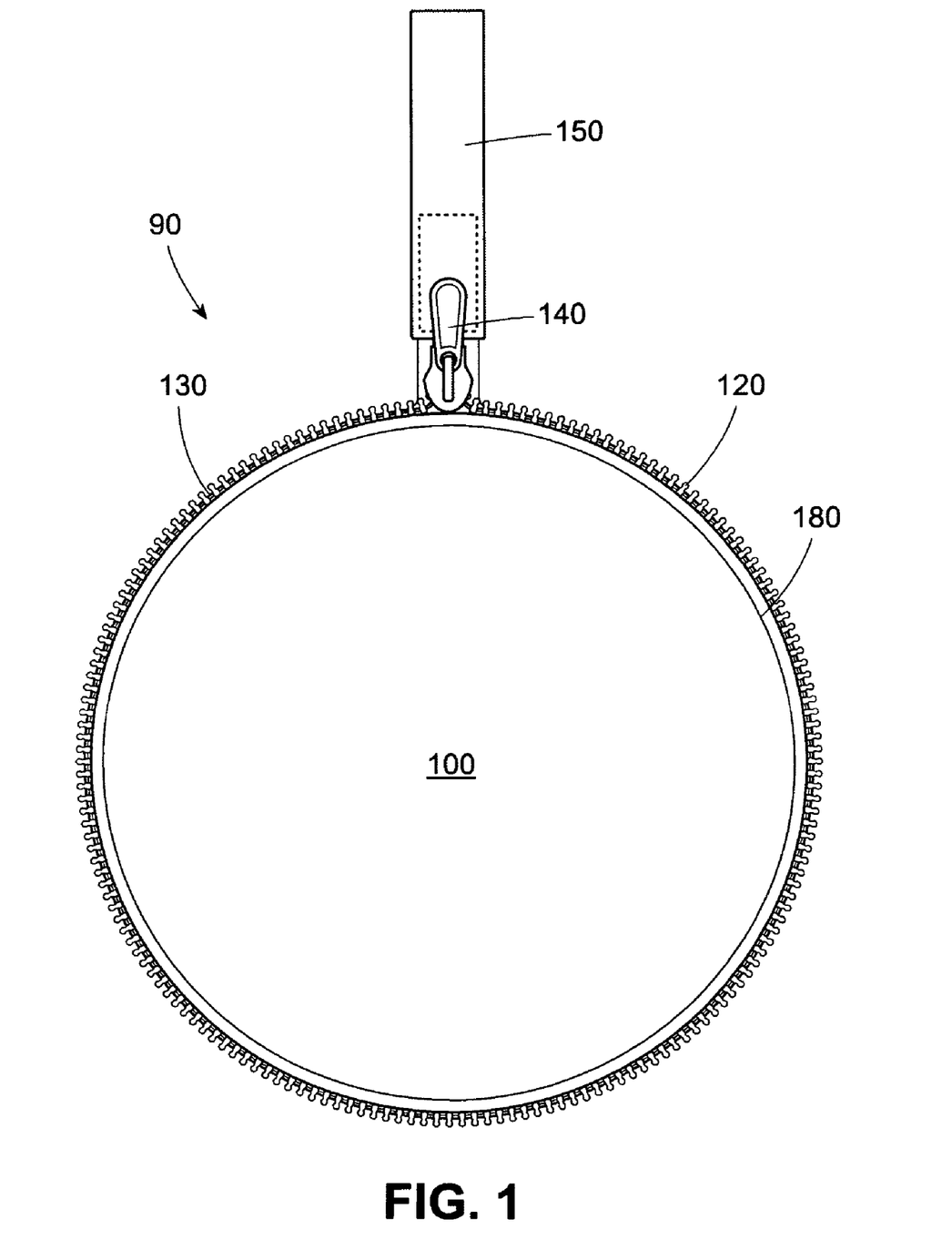
FIG. 1 is a view of an open foldable mouse pad according to an embodiment of the present invention.
Figure 3:
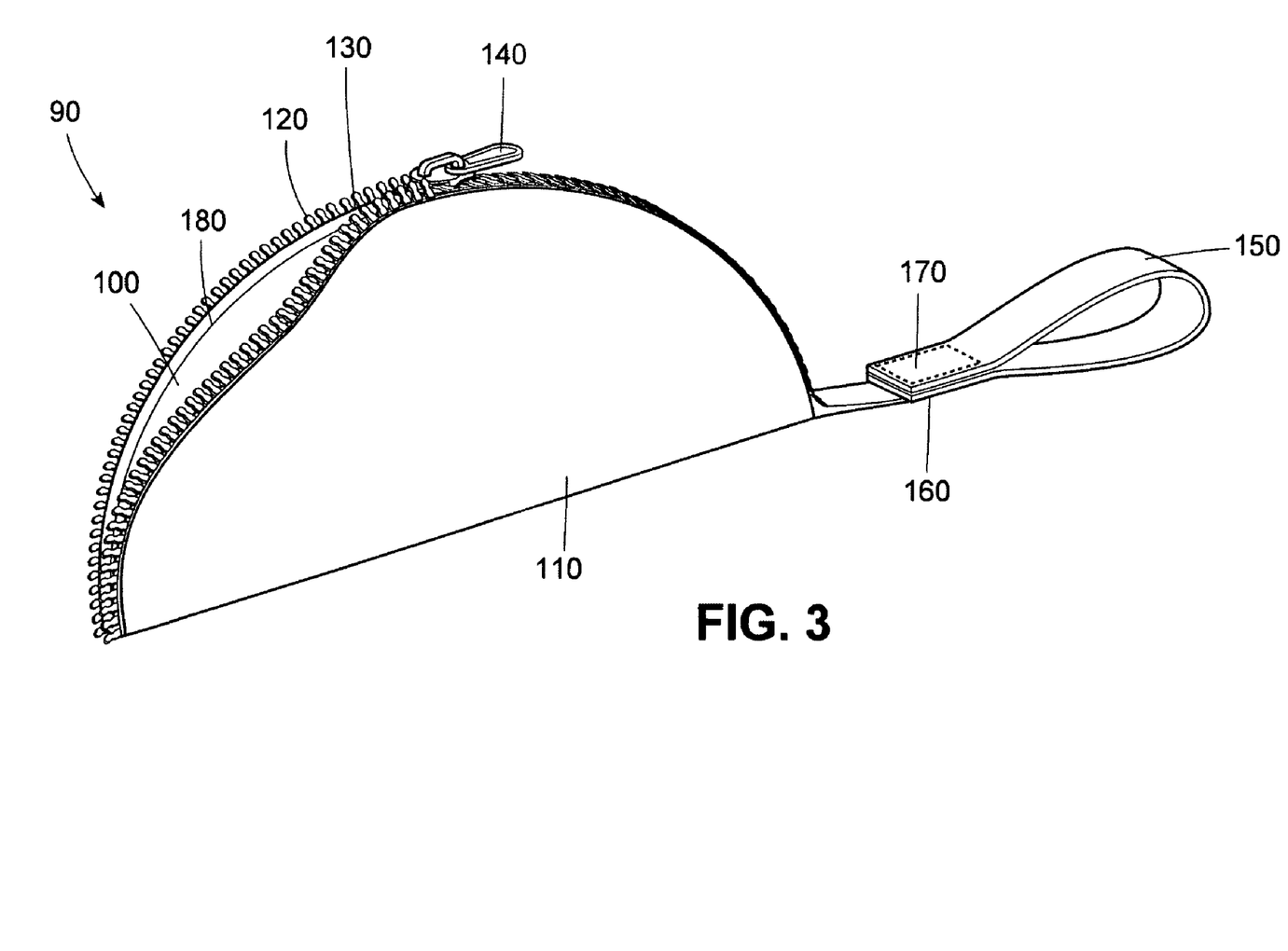
FIG. 3 is a view of a folded mouse pad of FIG. 1 according to an embodiment of the present invention.

FIG. 1 is a view of an open foldable mouse pad 90 according to an embodiment of the present invention. FIG. 3 is a perspective view of a folded and partially fastened mouse pad 90 of FIG. 1 according to an embodiment of the present invention. As illustrated in FIGS. 1 and 3, the foldable mouse pad perimeter contains a perimeter of piping 180, zipper binding 130, and zipper 120. Zipper pull tab 140 is attached to the zipper 120. The top surface of the mouse pad 100 extends to the end of the piping perimeter 180. Zipper 120 is located further away from a center of the mouse pad 90 than the piping perimeter 180. The bottom surface 110 of the mouse pad is a non-skid pattern, which is printed on or molded to the under or bottom side of the mouse pad.

Figure 2:
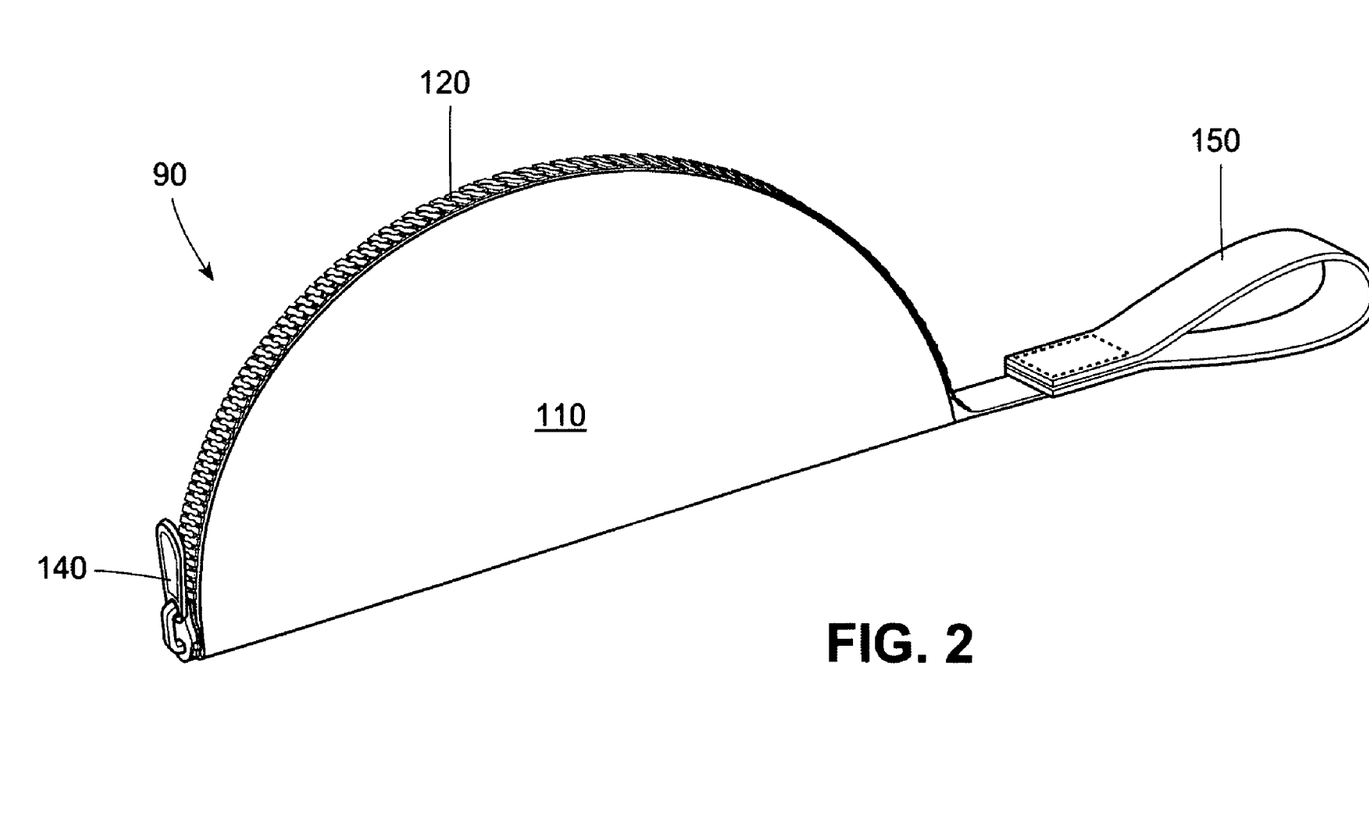
FIG. 2 is a view of a folded mouse pad of FIG. 1 according to an embodiment of the present invention.

FIG. 2 illustrates a view of a folded and fastened, or zipped, mouse pad 90 of FIG. 1. In FIG. 2, the mouse pad 90 is in a folded position and zipped closed forming a pouch.

Figure 4:
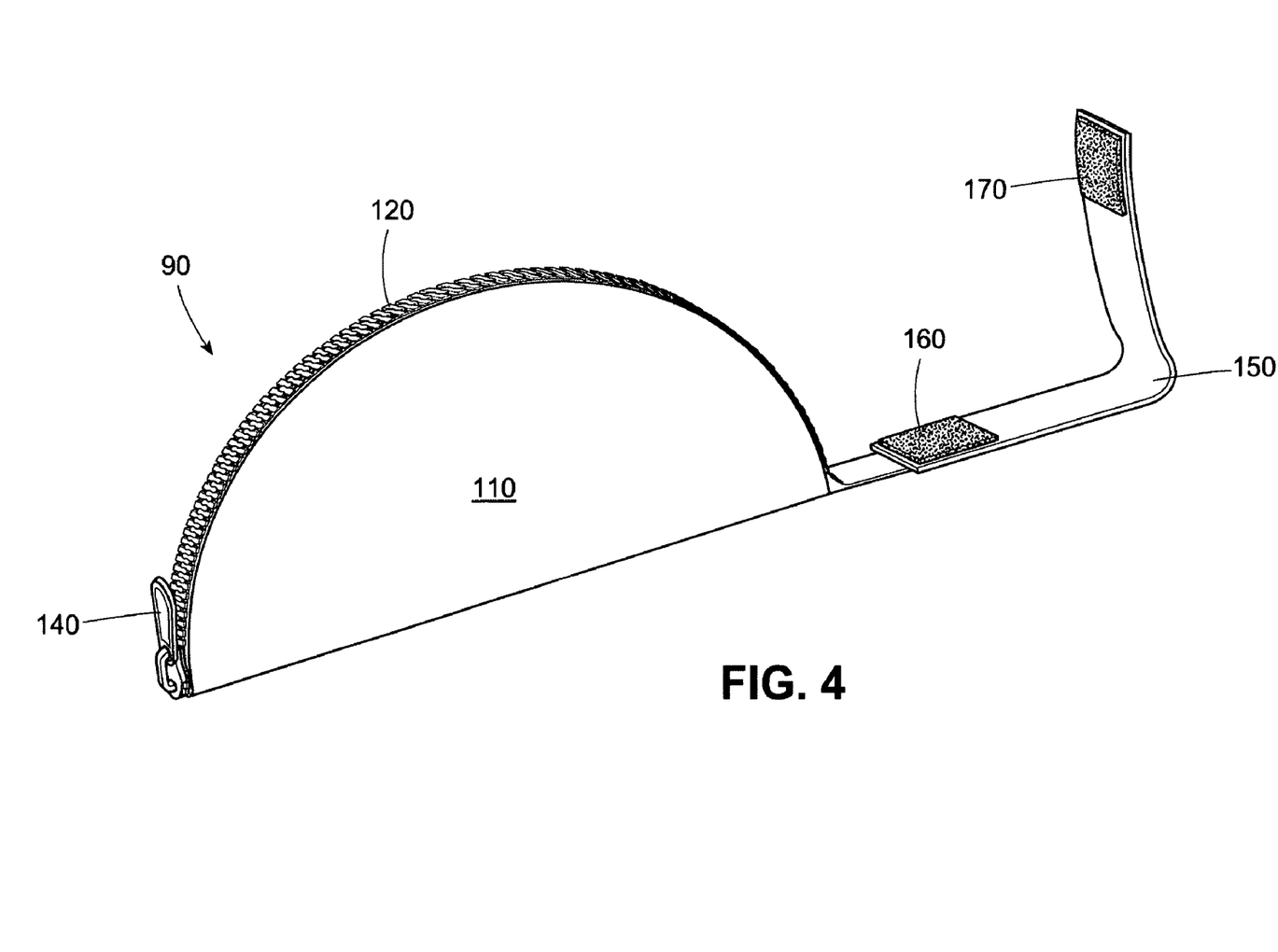
FIG. 4 is a view of the attachment mechanism of FIGS. 1, 2, and 3 according to an embodiment of the present invention.

As illustrated in FIGS. 1, 2, and 3, the mouse pad has an attachment mechanism 150. As further illustrated in FIG. 4, the mouse pad attachment mechanism 150 comprises female velcro 160 and male velcro 170. Of course, as was alluded to above, attachment mechanism 150 can exist in a variety of configurations other than that just described. As just one example of such an alternate embodiment, the attachment mechanism can be in the shape of a metal key ring.

Figure 5:
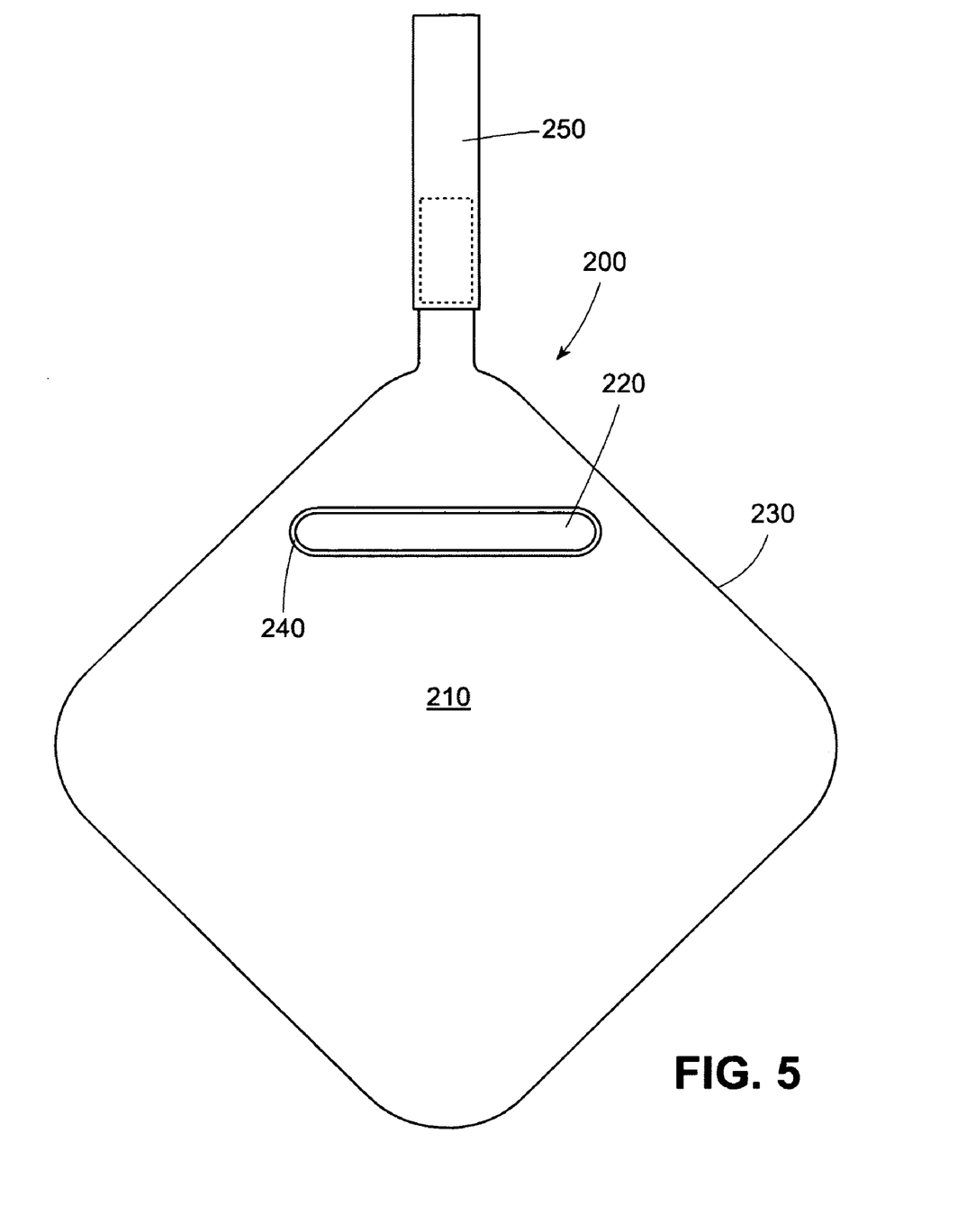
FIG. 5 is a view of a mouse pad with a pocket according to an embodiment of the present invention.

FIG. 5 is a view of a mouse pad 200 comprising a pocket 220 for storage of computer and electronic accessories. The mouse pad surface 210 has a perimeter 230 and the mouse pad pocket 220 has a perimeter 240. The mouse pad pocket 220 is capable of receiving a portable electronic device or computer accessory. This illustration also has an attachment mechanism 250 attached to the mouse pad.

Figure 6:
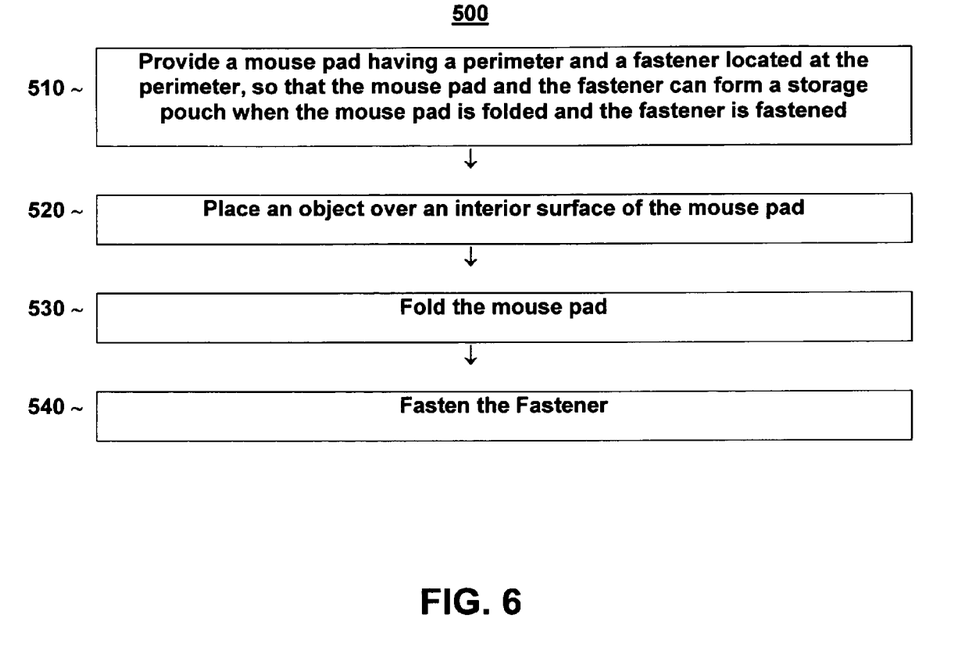
FIG. 6 is a flow chart illustrating a method of using a mouse pad according to an embodiment of the present invention.

FIG. 6 is a flow chart illustrating a method 500 of using a mouse pad according to an embodiment of the present invention. A step 510 of method 500 is to provide a mouse pad having a perimeter and a fastener located at the perimeter, so that the mouse pad and the fastener can form a storage pouch when the mouse pad is folded and the fastener is fastened. Another step 520 of the method 500 is to place an object on or over an interior surface of the mouse pad. Another step 530 of the method 500 is to fold the mouse pad, and an even further step 540 of the method 500 is to fasten the fastener.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the attachment mechanism discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention. As another example, the mouse pad 200 of FIG. 5 can include a fastener and/or perimeter of piping. As a further example, the fastener can be located only at a perimeter of the mouse pad, partially at the perimeter and partially elsewhere on the mouse pad, or at the entire perimeter. As an additional example, the mouse pad can be folded in thirds, quarters, etc. to form the storage pouch.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A mouse pad carrying case comprising:
   a mouse pad; and
   a fastener, wherein:
   the mouse pad and the fastener form a storage pouch when the mouse pad is folded and the fastener is fastened;
   wherein the fastener comprises a zipper;
   wherein the mouse pad forms a single circle when the zipper is unzipped and the mouse pad is laid flat to be used as a mouse pad;
   wherein the circle has a perimeter and the zipper extends around the perimeter of the circle;
   wherein the mouse pad is folded along a diameter of the circle when the zipper is zipped and the mouse pad is folded to form the storage pouch; and
   wherein the zipper has a pull tab and wherein the mouse pad is configured so that the pull tab is located at a first end of said diameter when the zipper is zipped and the mouse pad is folded to form the storage pouch, and wherein the mouse pad is configured so that the pull tab is located at an opposite second end of said diameter when the zipper is unzipped and the mouse pad is laid flat to be used as a mouse pad.

2. A mouse pad carrying case according to claim 1, wherein the mouse pad comprises neoprene.

3. A mouse pad carrying case according to claim 2, wherein the neoprene has a thickness between 1 and 5 mm.

4. A mouse pad carrying case according to claim 2, wherein the neoprene has a thickness between 2 and 3 mm.

5. A mouse pad carrying case according to claim 1, wherein the diameter of the circle is between 15 and 30 cm.

6. A mouse pad carrying case according to claim 1, wherein the diameter of the circle is between 20 and 25 cm.

7. A mouse pad carrying case according to claim 1, further comprising an attachment mechanism that is capable of attaching the mouse pad to another object.

8. A mouse pad carrying case according to claim 7, wherein the attachment mechanism comprises a fabric strap comprising velcro.

9. A mouse pad carrying case according to claim 7, wherein the attachment mechanism is coupled to the mouse pad at the second end of said diameter.

10. A mouse pad carrying case according to claim 7, wherein the attachment mechanism has a first end that is coupled to the mouse pad and a second end that is opposite to the second end, and wherein the attachment mechanism has a first piece of velcro adjacent to the first end and a second piece of velcro adjacent to the second end.

11. A mouse pad carrying case according to claim 7, wherein the attachment mechanism comprises a snap button.

12. A mouse pad carrying case according to claim 1, wherein the mouse pad has a perimeter of piping to prevent a mouse from sliding off a top surface of the mouse pad on or located over an uneven or slanted surface when the mouse pad is in use as a mouse pad.

13. A mouse pad carrying case according to claim 1, further comprising a rim at the perimeter of the mouse pad.

14. A mouse pad carrying case according to claim 13, wherein the mouse pad has a center and wherein the fastener is further away from the center of the mouse pad than the rim.

15. A mouse pad carrying case according to claim 1, wherein the mouse pad comprises a bottom surface comprising a non-skid pattern.

16. A mouse pad carrying case according to claim 1, wherein the fastener is located at the entire perimeter.

17. A mouse pad according to claim 1 comprising a pocket having an opening.

18. A mouse pad according to claim 17, wherein the mouse pad further comprises a bottom surface having a textured material having a non-skid pattern.

19. A mouse pad according to claim 18, wherein the opening of the pocket is located at the bottom surface of the mouse pad.

20. A mouse pad according to claim 17, wherein the opening of the pocket is at the perimeter.

21. A mouse pad according to claim 17, wherein the pocket is large enough to fit a mouse or a flash drive.

22. A mouse pad according to claim 17, wherein the opening of the pocket is sealable.

23. A mouse pad carrying case according to claim 1, further comprising a top surface and a bottom surface opposite the top surface, wherein:
   the top surface is designed to be used as a surface on which a mouse is operated.

24. A mouse pad carrying case comprising:
   a mouse pad;
   a fastener; and
   an attachment mechanism that is capable of attaching the mouse pad to another object;
   wherein:
   the mouse pad and the fastener form a storage pouch when the mouse pad is folded and the fastener is fastened;
   the attachment mechanism comprises a fabric strap that is coupled to the mouse pad.
   the fastener comprises a zipper and when the zipper is unzipped and the mouse pad is laid flat to be used as a mouse pad, the mouse pad has a perimeter and the zipper extends around the perimeter of the mouse pad;
   the mouse pad forms a single circle when the zipper is unzipped and the mouse pad is laid flat to be used as a mouse pad;
   the zipper extends around the circle;
   the mouse pad is folded along a diameter of the circle when the zipper is zipped and the mouse pad is folded to form the storage pouch; and
   the zipper has a pull tab and the mouse pad is configured so that the pull tab is located at a first end of said diameter when the zipper is zipped and the mouse pad is folded to form the storage pouch, and the mouse pad is configured so that the pull tab is located at an opposite second end of said diameter when the zipper is unzipped and the mouse pad is laid flat to be used as a mouse pad.

25. A mouse pad carrying case according to claim 24, wherein the attachment mechanism is coupled to the mouse pad at the second end of said diameter.

26. A mouse pad carrying case according to claim 24, wherein:
   the mouse pad comprises neoprene;
   the neoprene has a thickness between 1 and 5 mm; and
   the diameter of the circle is between 15 and 30 cm.

27. A mouse pad carrying case according to claim 24, wherein the mouse pad has a perimeter of piping to prevent a mouse from sliding off a top surface of the mouse pad on or located over an uneven or slanted surface when the mouse pad is in use as a mouse pad.

28. A mouse pad carrying case according to claim 24, wherein the attachment mechanism has a first end that is coupled to the mouse pad and a second end that is opposite to the second end, and wherein the attachment mechanism has a first piece of velcro adjacent to the first end and a second piece of velcro adjacent to the second end.

29. A mouse pad carrying case according to claim 24, wherein the attachment mechanism comprises a snap button.

30. A mouse pad carrying case according to claim 24, wherein the attachment mechanism comprises velcro.

* * * * *

UNITED STATES PATENT AND TRADEMARK OFFICE
CERTIFICATE OF CORRECTION

| | | |
|---|---|---|
| PATENT NO. | : 7,843,432 B2 | Page 1 of 1 |
| APPLICATION NO. | : 11/649993 | |
| DATED | : November 30, 2010 | |
| INVENTOR(S) | : Barry Sween et al. | |

It is certified that error appears in the above-identified patent and that said Letters Patent is hereby corrected as shown below:

At column 6, line 38, delete the "." and replace with a --;--.

Signed and Sealed this
Eighth Day of February, 2011

David J. Kappos
*Director of the United States Patent and Trademark Office*